(12) United States Patent
Bauer et al.

(10) Patent No.: US 11,648,857 B2
(45) Date of Patent: May 16, 2023

(54) VENTILATING DEVICE FOR A VEHICLE SEAT

(71) Applicant: I.G. BAUERHIN GMBH, Gruendau (DE)

(72) Inventors: Stefan Bauer, Alzenau (DE); Thorsten Schleucher, Hasselroth (DE)

(73) Assignee: I.G. Bauerhin GmbH, Gruendau (DE)

( * ) Notice: Subject to any disclaimer, the term of this patent is extended or adjusted under 35 U.S.C. 154(b) by 1395 days.

(21) Appl. No.: 14/324,532

(22) Filed: Jul. 7, 2014

(65) Prior Publication Data

US 2015/0079892 A1 Mar. 19, 2015

(30) Foreign Application Priority Data

Jul. 9, 2013 (DE) ...................... 20 2013 006 135.9

(51) Int. Cl.
*B60N 2/56* (2006.01)
*B60H 1/34* (2006.01)

(52) U.S. Cl.
CPC ............. *B60N 2/5642* (2013.01); *B60H 1/34* (2013.01)

(58) Field of Classification Search
CPC ................................. B60H 1/34; B60N 2/5642
See application file for complete search history.

(56) References Cited

U.S. PATENT DOCUMENTS 2,051,494 A * 8/1936 Mitchell ................. A47C 7/425
297/382
2,528,412 A * 10/1950 Bickler ................ B60N 2/5635
297/230.11
2,777,176 A * 1/1957 Packard .................. F24F 13/08
160/104

(Continued)

FOREIGN PATENT DOCUMENTS

DE 1430902 A1 * 11/1968 ........... B60N 2/7035
DE 102005014333 A1 10/2006

(Continued)

OTHER PUBLICATIONS

Hadzizukic, DE 102005014333 A1 English machine translation, 10/5/12006.*

(Continued)

*Primary Examiner* — Edelmira Bosques
*Assistant Examiner* — Phillip Decker
(74) *Attorney, Agent, or Firm* — Robert W. Morris; Eckert Seamans Cherin & Mellott, LLC

(57) ABSTRACT

Heating and cooling device for a vehicle seat with separating material (2) that forms at least a portion of an air-distribution chamber (1), with an upper-side layer (4) covering the separating material (2) on its upper side, with a lower-side layer (5) of separating material (2) on the underside opposite from the upper-side layer (4) that is essentially airtight whereby the upper-side layer (4) and the lower-side layer (5) are connected together about the outer circumference of the separating materials (2). An air-inlet aperture (6) is provided (Continued)

to the air-distribution chamber (1) and air-outlet apertures (10) are provided in the upper-side layer (4) to remove air from the air-distribution chamber (1). The upper-side layer (4) and the lower-side layer (5) are connected at least about their outer circumference by a box-shaped insert (3).

21 Claims, 9 Drawing Sheets

(56) References Cited

U.S. PATENT DOCUMENTS

| | | | | | |
|---|---|---|---|---|---|
| 3,063,753 | A * | 11/1962 | Mitchell | | A47C 7/425 297/382 |
| 3,162,489 | A * | 12/1964 | Trotman | | A47C 7/74 297/452.45 |
| 3,211,497 | A * | 10/1965 | Bounous | | A47C 7/185 297/452.55 |
| 3,300,252 | A * | 1/1967 | Blechman | | A47C 7/425 297/452.44 |
| 3,661,195 | A * | 5/1972 | Fischer | | E06B 7/26 160/373 |
| 4,043,091 | A * | 8/1977 | Katona | | F24C 15/04 52/786.1 |
| 4,413,857 | A * | 11/1983 | Hayashi | | A47C 7/74 297/180.11 |
| 4,970,743 | A * | 11/1990 | Wride | | A47C 27/085 5/201 |
| 5,460,862 | A * | 10/1995 | Roller | | E06B 3/66319 428/141 |
| 5,544,942 | A * | 8/1996 | Vu Khac | | A47C 7/18 297/452.27 |
| 5,597,200 | A * | 1/1997 | Gregory | | A47C 7/74 297/180.13 |
| 5,902,014 | A * | 5/1999 | Dinkel | | B60N 2/5635 297/180.1 |
| 5,960,496 | A * | 10/1999 | Boyd | | A47C 27/144 5/722 |
| 6,189,966 | B1 * | 2/2001 | Faust | | B60N 2/5635 297/180.13 |
| 6,286,903 | B1 * | 9/2001 | Proux | | A47C 7/18 297/452.26 |
| 7,261,371 | B2 * | 8/2007 | Thunissen | | B60N 2/56 297/180.14 |
| 7,452,028 | B2 * | 11/2008 | Knoll | | A47C 7/74 297/180.1 |
| 7,467,823 | B2 * | 12/2008 | Hartwich | | B60H 1/00285 297/180.14 |
| 7,478,869 | B2 * | 1/2009 | Lazanja | | B60N 2/5635 297/180.13 |
| 7,488,284 | B2 * | 2/2009 | Hanson | | H04R 25/606 600/25 |
| 7,665,803 | B2 * | 2/2010 | Wolas | | A47C 7/744 297/180.1 |
| 7,931,330 | B2 * | 4/2011 | Itou | | B60N 2/5635 297/180.14 |
| 8,007,891 | B2 * | 8/2011 | Poulakis | | A44B 18/00 29/428 |
| 9,283,879 | B2 * | 3/2016 | Helmenstein | | B60N 2/5657 |
| 9,533,609 | B2 * | 1/2017 | Bauer | | B60N 2/5642 |
| 10,272,806 | B2 * | 4/2019 | Bauer | | B60N 2/5635 |
| 2002/0003363 | A1 * | 1/2002 | Buss | | B60N 2/5635 297/180.14 |
| 2003/0000021 | A1 * | 1/2003 | O'Connell | | A47C 27/002 5/739 |
| 2003/0019043 | A1 * | 1/2003 | Bryant | | A47C 23/0522 5/719 |
| 2004/0036326 | A1 * | 2/2004 | Bajic | | B60N 2/56 297/180.14 |
| 2004/0261186 | A1 * | 12/2004 | Gladney | | A47C 23/00 5/717 |
| 2005/0243331 | A1 * | 11/2005 | Ishima | | B60N 2/5621 356/614 |
| 2006/0158011 | A1 * | 7/2006 | Marlovits | | A47C 7/02 297/180.1 |
| 2006/0175877 | A1 * | 8/2006 | Alionte | | A47C 7/74 297/180.14 |
| 2007/0040421 | A1 * | 2/2007 | Zuzga | | B60N 2/5657 297/180.13 |
| 2010/0327636 | A1 * | 12/2010 | Stoll | | B60H 1/00285 297/180.1 |
| 2011/0109128 | A1 * | 5/2011 | Axakov | | A47C 7/744 297/180.1 |
| 2012/0315132 | A1 * | 12/2012 | Axakov | | B60N 2/5635 415/182.1 |
| 2016/0214219 | A1 * | 7/2016 | Subhedar | | A47C 27/05 |
| 2017/0001547 | A1 * | 1/2017 | Bauer | | B60N 2/5657 |
| 2017/0028885 | A1 * | 2/2017 | Bauer | | B60N 2/5621 |
| 2017/0282764 | A1 * | 10/2017 | Bauer | | B60N 2/5642 |
| 2019/0176663 | A1 * | 6/2019 | Hoshi | | B60N 2/5657 |

FOREIGN PATENT DOCUMENTS

| | | | | |
|---|---|---|---|---|
| DE | 20321141 | U1 | 11/2006 | |
| DE | 102006004465 | A1 | 8/2007 | |
| EP | 2138348 | A1 * | 12/2009 | ........... B60N 2/5664 |
| EP | 2423040 | A2 | 8/2010 | |
| GB | 2219964 | A * | 12/1989 | ............... A47C 7/18 |
| JP | 2009125216 | A * | 6/2009 | |
| JP | 2012010921 | A * | 1/2012 | |
| JP | 2012229887 | A * | 11/2012 | |

OTHER PUBLICATIONS

Hirakawa, JP 2012-229887 A English machine translation, Nov. 22, 2012.*

Shibaya et al., JP 2012010921A English machine translation, Jan. 19, 2012.*

* cited by examiner

VENTILATING DEVICE FOR A VEHICLE SEAT

BACKGROUND OF THE INVENTION

The invention relates to a heating and cooling device for a vehicle seat, in particular a ventilating device with spacer material that forms at least a portion of an air-distribution chamber, an upper-side layer covering the spacer material on its upper side and a lower-side layer of spacer material on the underside opposite from the upper-side layer essentially airtight, whereby the upper-side layer and the lower-side layer are connected together about the outer circumference of the spacer material. An air-inlet aperture is provided for the air-distribution chamber and air-outlet apertures are provided in the upper-side layer to remove air from the air-distribution chamber.

Such heating and cooling devices are generally known.

For example, EP 2 423 040 A2 describes an insert to ventilate a seat with a non-airtight separating part that is encased within an airtight shell whereby this covering part is formed like a pouch. The upper side and the lower side of this pouch are bound flatly together at their edges with one on the other. Air pass-through apertures are located about the circumference.

DE 203 21 141 U1 describes an insert to ventilate a vehicle seat that is located below the seat cover of a seat cushion or seat back. The insert possesses spacer material that is covered on its lower side by a barrier layer whereby this barrier layer is attached to the spacer material by means of an adhesive layer. On the upper side, spacer material is covered by an additional barrier layer, which in turn is attached to the spacer material by means of adhesive layer. A heating layer, which is covered by a buffer layer, is in turn attached by means of an adhesive layer to the barrier layer. Pass-through apertures are located in the layers above the spacer material. The separating part with its layers located on it possesses an extension that serves to guide air from a ventilator located remotely from the seat-base surface or seat-back surface.

DE 10 2005 014 333 A1 relates to a heated and cooled seat and a heating and cooling device. The heating and cooling device comprises a heating and cooling mat located below the surface of the seat-base surface or below the surface of the seat back and connected with an air-supply device, e.g., a ventilator. The heating and cooling mat is formed as a sack of essentially airtight material whereby the upper side of the bag includes air pass-through apertures.

DE 10 2006 004 465 A1 describes an inlaid component for a heated and cooled vehicle seat. The inlaid component comprises at least one non-airtight top layer, a three-dimensional air-distribution layer under it, and at least one lower top layer that comprises at least one air inlet. The upper top layer and the lower top layer are connected together along a lateral edge of the air-distribution layer.

SUMMARY OF THE INVENTION

It is the objective of this invention to provide a heating and cooling device for a vehicle seat with a ventilating device that possesses a simple design, that is simple to manufacture, and that meets the requirements placed on such a heating and cooling device during use in a vehicle.

This objective, as well as other objectives which will become apparent from the discussion that follows, are achieved, according to the present invention, by connecting the upper side layer and the lower side layer, at least about their outer circumference, by a frame-shaped insert.

According to a particular feature of the invention, the frame-shaped insert surrounds the spacer material, which advantageously involves a knitted separator that limits an air-distribution chamber between the upper-side layer and the lower-side layer. This frame-shaped insert should be of such a material, and should possess such properties, that it is essentially airtight so that the insert limits flow from the air-distribution chamber outward.

A heating and cooling device based on the invention may be integrated into a vehicle seat directly onto the upholstery core of the seat. It is particularly suited, however, to insertion into an indentation or recess within an upholstery core that is of foamed material, for example. In such case, such an indentation or recess could be sized such that a free space remains between the circumference of the frame-shaped insert of the heating and cooling device and the circumference of the indentation or recess that forms a channel through which air may be supplied or exhausted, and water vapor may also be diverted as necessary. For this, the frame-shaped insert is of a material that is partially permeable for air and/or for water vapor.

The frame-shaped insert of the heating and cooling device limiting the spacer material along its circumference has the advantage that the heating and cooling device may possess an essentially exact right-angle shape even in the edge area since the upper-side layer and the lower-side layer may end directly at the edge of the frame-shaped insert to which these layers are adhered. A further advantage of the frame-shaped insert consists in the fact that the material of the insert may be matched to the material of the spacer materials, particularly with respect to wear hardening, which can ensure that a person seated on the seat does not perceive transitional areas between materials. The heating and cooling device based on the invention is particularly suited to being directly foamed into a seat-base cushion when it is manufactured. In such case, the material of the frame-shaped insert should be selected such that the foam does not penetrate through the insert material into the air-distribution chamber. In this case, the material for the frame-shaped insert is preferably essentially closed-cell foam, fleece, felt, or synthetic plastic polymers such as silicone, for example. Additional advantages of the frame-shaped insert include a firm connection with the upholstery or foam core. If the heating and cooling device is foamed into a foam core, the frame-shaped insert prevents penetration of the foam. The frame-shaped insert forms a flat surface that is important during the foaming process: the surface prevents folding and/or over-foaming of the heating and cooling device. Any potential folding in the seat covering that may form on the side of a seat on which a person sits is thus avoided.

While on the one hand a foamed material, which is advantageous from a cost perspective, is a preferred material for the frame-shaped insert, closed-cell rubber may be used. Such a closed-cell rubber should be as airtight as possible, and thus provides an advantage when a narrow frame is required. Another material may be closed-cell sponge. Sponge has the advantage of a high degree of wear hardening, which allows a comfortable and/or stable bridging of interstitial spaces larger than 30 mm.

If the frame-shaped insert is adhered to the upper-side layer and/or the lower-side layer, a temperature-activated adhesive should be applied to the top-side and/or the lower-side layer. A two-sided adhesive tape should preferably be used as the adhesive since it allows quicker bonding between the upper-side layer and/or the lower-side layer with frame-shaped insert.

The frame-shaped insert is preferably sized such that it possesses a width seen along the direction of the plane of the upper-side layer or of the lower-side layer of 5 mm to 30 mm, preferably of 5 mm to 20 mm, or from 10 mm to 15 mm. Depending on the material used, the frame-shaped insert may be manufactured with a very narrow width, e.g., with a width between 5 mm and 10 mm, so that a very large surface of the heating and cooling device may be used as an air-distribution chamber. A particular advantage of the frame-shaped insert also to be emphasized is the fact that it may be manufactured with varying widths along the circumference of the spacer material so that the circumferential shape of the air-distribution chamber may be simply matched to the peculiarities of the seat-base surface of a seat that is to be heated and/or cooled.

The frame-shaped insert should possess a thickness in a direction perpendicular to the plane of the upper-side layer or the lower-side layer that roughly corresponds to the thickness of the spacer materials along this direction.

In another particularly advantageous embodiment, the spacer material possesses at least one punched-out area that is filled with an inlay of an essentially airtight material. Such inlays allow the air-distribution chamber to be divided into different flow areas and thus structured. For this, it is also provided that such inlays are connected by at least one spar of the frame-shaped insert to form a single piece. In such case, the frame-shaped insert with the inlay and/or the inlays is manufactured as a single, interconnected, textured structure into which suitably-shaped spacer material forming the air-distribution chamber is then inserted.

The same material used for the frame-shaped insert may be used as material for the inlays. It is also possible, however, to manufacture the inlays of a different material, but the material must not alter the properties of the spacer materials, particularly with respect to wear hardening of the entire surface of the spacer materials so that a person seated on the seat perceives no texture within the heating and cooling device and/or the surface of the spacer materials. A foamed material, closed-cell foam rubber, closed-cell sponge, or a silicone-type material should be chosen as material for the inlays.

Like the frame-shaped insert, the inlays may be adhered to the upper-side layer and/or the lower-side layer.

The minimum of one inlay may also be adhered to the spacer material. The inlay may be attached to the spacer material by means of overlapping thermal adhesive, adhesive tape, or suitable adhesive.

If inlays are provided within the spacer materials, a pass-through aperture from the upper-side layer to the lower-side layer may be formed within the area of such inlays, said aperture extending through the upper-side layer, and through the lower-side layer as necessary. Such pass-through apertures may be used as suspension apertures for the seat covering. As necessary, such pass-through apertures may serve for air supply or exhaust from the seat-base surface. Since these pass-through apertures are provided in the inlays, the pass-through apertures are sealed with respect to the air-distribution chamber by the material of the inlays. Simultaneously, the separating material is stabilized by the inlays, and/or the spacer material is not weakened and its strain behavior is not altered because of the pass-through apertures.

Using the inlays, the air flow may be guided within the air-distribution chamber and distributed or channeled into the various areas of the air-distribution chamber without additional design expense. This means that such inlays form a flow-guide body. In their function as flow-guide bodies, the inlays preferably possess a teardrop-shaped cross section whereby the broad side faces the approach direction for the air stream.

In addition to the air-outlet apertures, it is also provided that the upper-side layer be at least partially non-airtight. For this, the number of air-outlet apertures per unit of area of the air-distribution chamber seen in projection onto the upper-side layer increases as the separation from the air-inlet aperture increases.

The frame-shaped insert offers a simple design opportunity to implement the air-inlet aperture to the air-distribution chamber as an interruption of the frame-shaped insert. Moreover, additional air-inlet apertures to the air-distribution chamber and/or air-outlet apertures from the air-distribution chamber may be formed by interruptions or free spaces in the frame-shaped insert.

In an additional embodiment example, the upper-side layer comprises an area, or at least a partial area, on the side facing toward a person that comprises a ferromagnetic and/or magnetic layer. During an additional processing step, this layer allows affixation of the heating and cooling device, e.g., during encasing the heating and cooling device in a foam core. This ferromagnetic and/or magnetic layer prevents intrusion of foreign bodies and/or foreign material during additional processing steps.

In an additional embodiment example, the upper-side layer comprises an additional airtight layer, so that the upper-side layer may possess a multi-layer structure. In a multi-layer structure, it is particularly significant that at least one air pass-through aperture be present in the additional airtight layer and in the upper-side layer.

In an additional embodiment example, the upper-side layer includes apertures only in the area in which the frame-shaped insert is mounted. For this, the apertures in the upper-side layer also pass through the frame-shaped insert. For this, frame-shaped insert may include laterally-mounted notches in the edge toward the air-distribution chamber so that air may flow from the air-distribution chamber through the frame-shaped insert and the upper-side layer.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
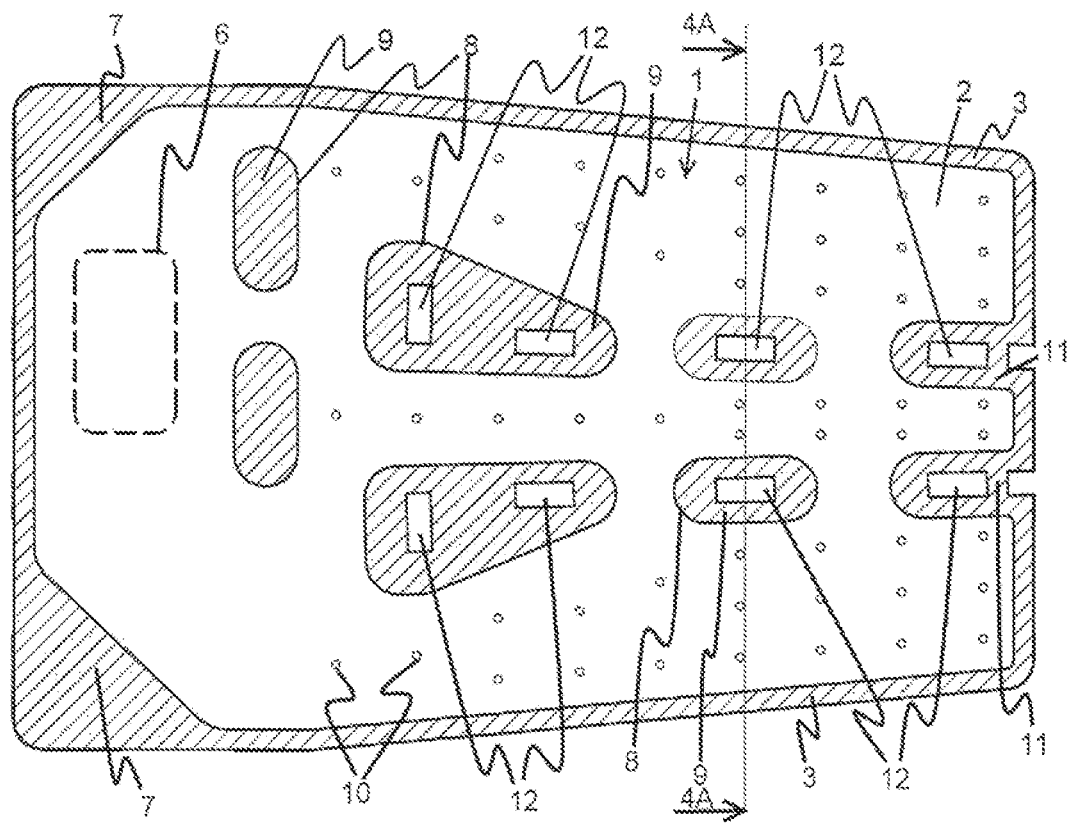
FIG. 1 is a schematic representation of a heating and cooling device per a first embodiment example of the invention in top view.

The preferred embodiments of the present invention will now be described with reference to FIGS. 1-9 of the drawings. Identical elements in the various figures are designated with the same reference numerals.

To the extent that components are represented in individual Figures with identical reference indices, then the implementation of these components in one Figure may analogously be transferred to the implementation of these analogous components in other Figures without describing these components for the other Figures again.

The ventilating devices in the various embodiment examples shown in FIGS. 1 through 9 comprise an air-distribution chamber 1 that is filled with spacer material 2 and is limited by a frame-shaped insert 3 about the outer circumference. As may be seen particularly from FIGS. 4A and 4B, the spacer material 2 and the frame-shaped insert 3 are covered from the upper side, which is the side facing toward a seated person, by an upper-side layer 4, and from the lower side, by a lower-side layer 5. The surfaces of the upper-side layer 4 and the lower-side layer 5 projected one onto the other are matched to the outer shape of the frame-shaped insert 3 so that they do not project outward above the frame-shaped insert 3 in the illustrated embodiment examples. The upper-side layer 4 and the lower-side layer 5 are adhered respectively to the upper side and the lower side of the frame-shaped insert 3. The spacer material 2 and the frame-shaped insert 3 possess the same thickness, as is shown in the Figures.

The ventilating device based on the invention also offers the option that the upper-side layer 4 be manufactured to possess greater surface area than the surface limited by the outer shape of the frame-shaped insert 3 so that a narrow surface section projects above the upper-side layer 4 about the circumference of the frame-shaped insert 3. If inserted into an indentation in the upholstery core, for example, the heating and cooling device may be secured to the upper side of the upholstery core by means of this projecting surface section, which is not shown in FIGS. 1 and 2, but may be seen in FIG. 3 and labeled with the reference index 14.

Figure 2:
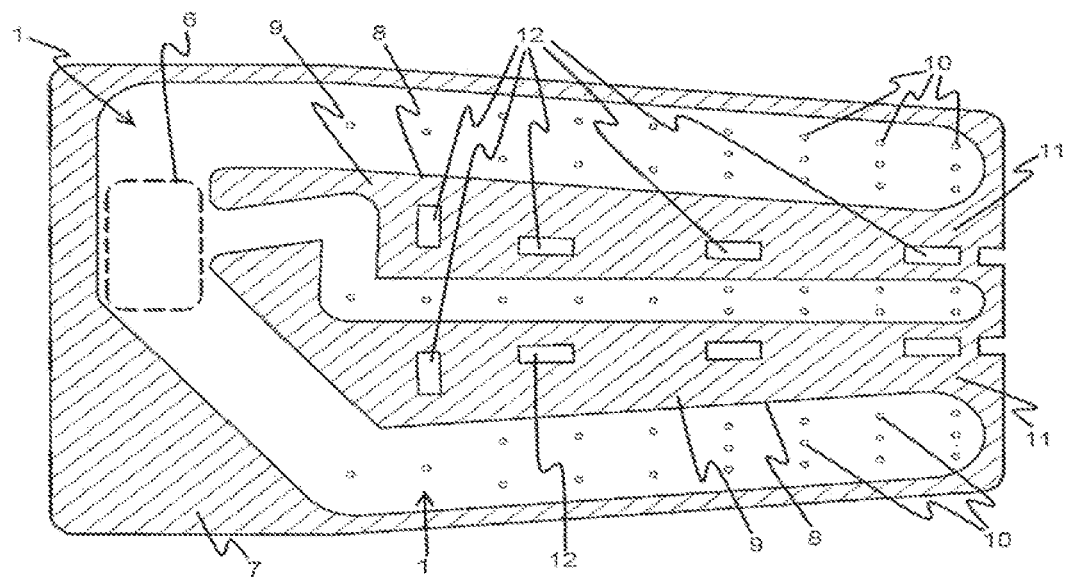
FIG. 2 is a representation per FIG. 1 of a second embodiment example of the invention.
Figure 6:
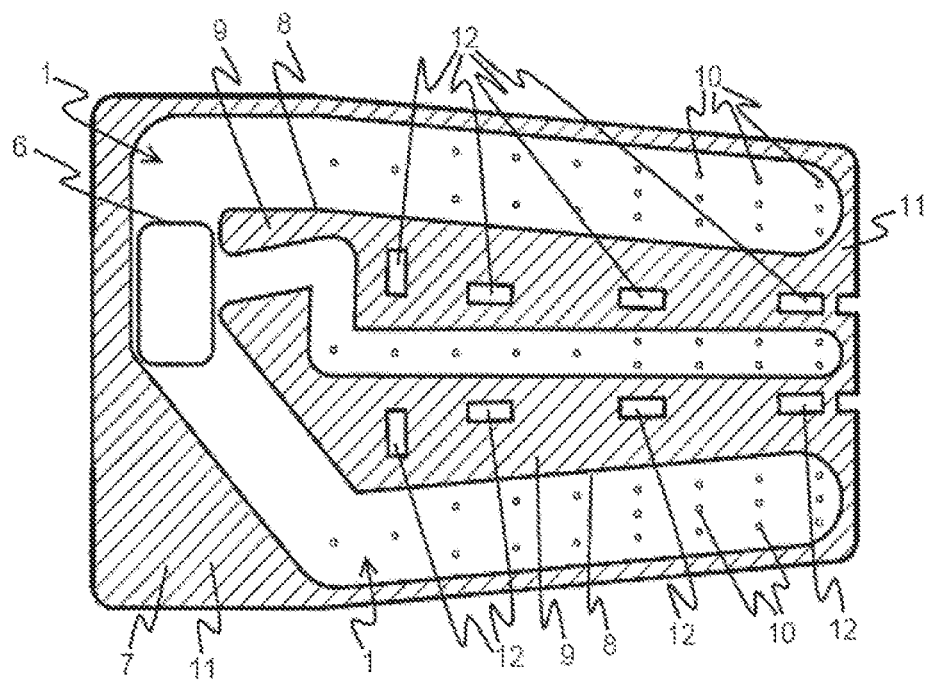
FIG. 6 is a representation per FIG. 2 in which, however, both the air-inlet aperture and the air-outlet apertures are mounted on the same side of the material.
Figure 7:
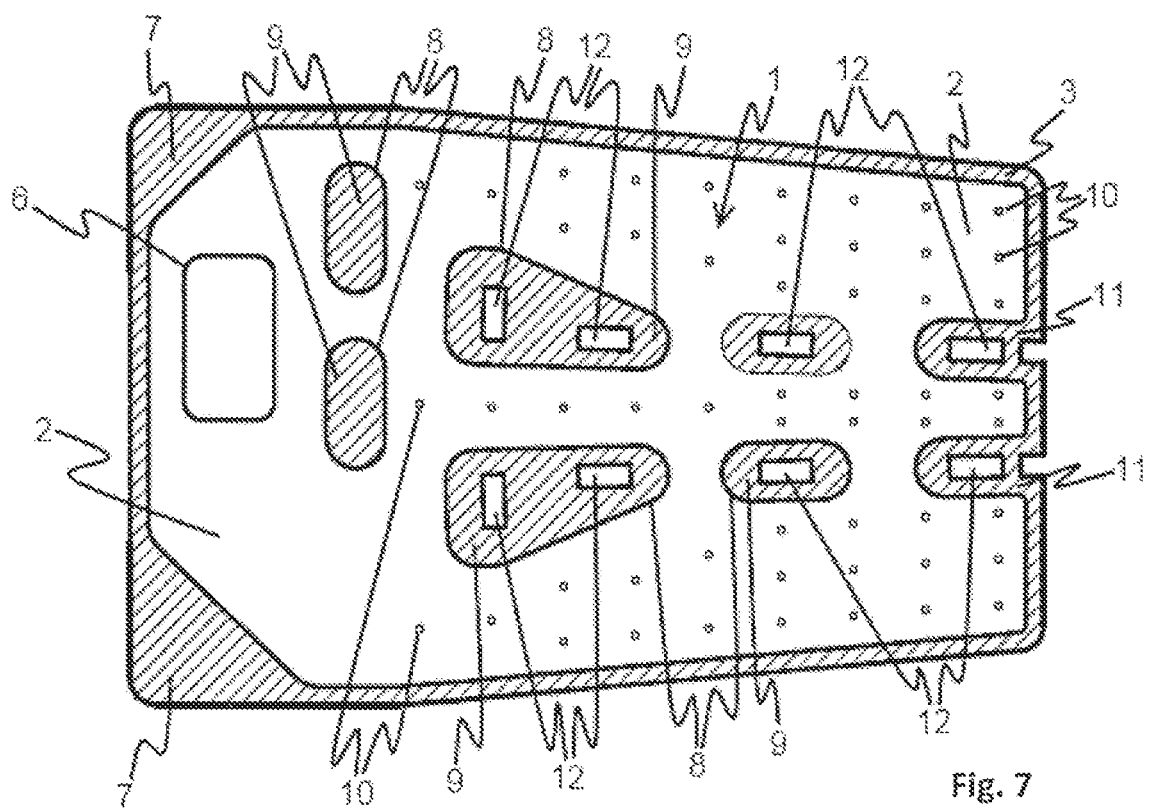
FIG. 7 is a representation per FIG. 1, in which, however, both the air-inlet aperture and the air-outlet apertures are mounted on the same side of the material.
Figure 8:
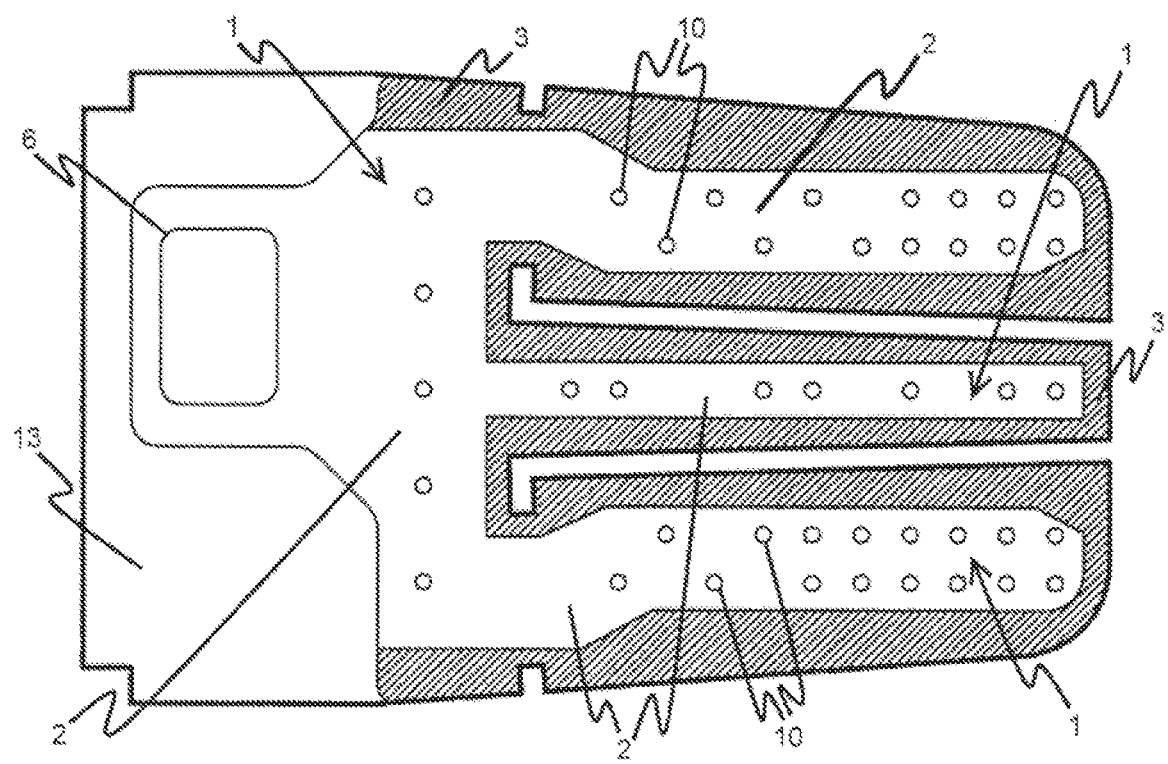
FIG. 8 is a representation per FIG. 6 of an additional embodiment example.
Figure 9:
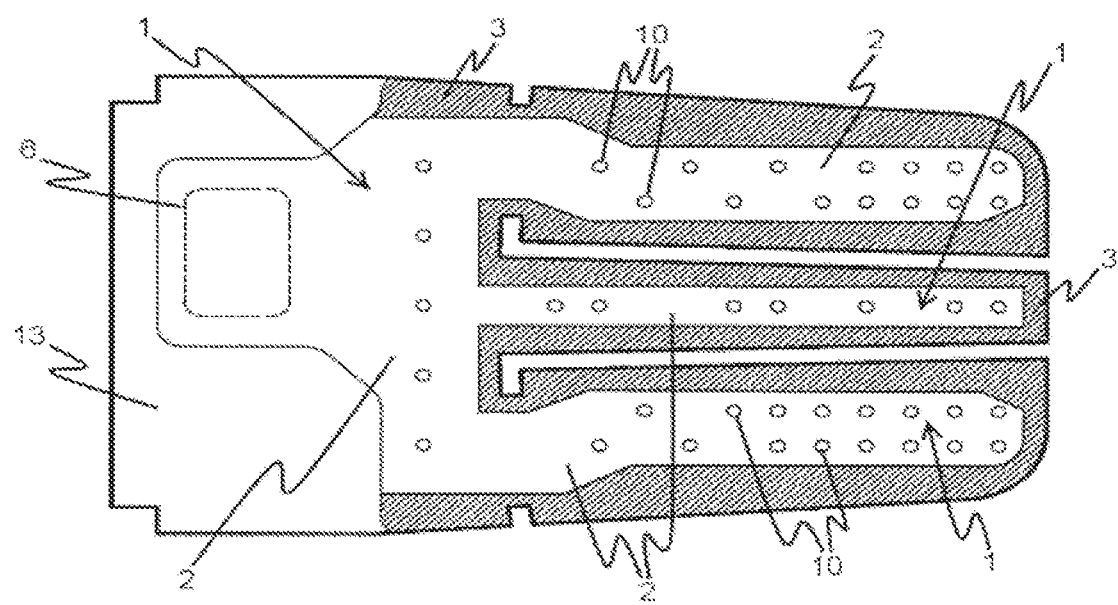
FIG. 9 is a representation per FIG. 8, in which, however, both the air-inlet aperture and the air-outlet apertures are mounted on the same side of the material.

An air-inlet aperture 6 to the air-distribution chamber 1, which may also be used as an air-outlet aperture is present in the lower-side layer 5 by means of which the air-distribution chamber 1 may be connected to a fan unit (not shown) for air flow. The air-inlet aperture 6, or the air-outlet aperture as necessary, is shown in FIGS. 1, 2, and 9 with a broken line since these apertures are present in the lower-side layer 5, and not in the upper-side layer 4. In FIGS. 6, 7, and 8, the air-inlet aperture 6 or the air-exhaust aperture as necessary and the air-outlet aperture 10 are mounted on the same side of the upper-side layer 4 whereby the positions of these apertures are matched to the installation situation in the vehicle seat.

The frame-shaped insert 3 possesses a constant width about the greatest portion of the circumference of the heating and cooling device in a direction seen in parallel to the plane of the upper-side layer or the lower-side layer of 5 mm to 30 mm, preferably from 5 mm to 20 mm, or from 10 mm to 15 mm. The width should be as small as possible so that, in relation to the surfaces under tension by the outer circumference of the heating and cooling device, a large surface remains for the air-distribution chamber 1. Resultantly, the width of the frame-shaped insert 3, at least in specific areas of the heating and cooling device, is 5 mm and less, which means from 3 mm through 5 mm. The frame-shaped insert 3 makes it possible to alter the shape of the air-distribution chamber 1 simply in that parts of the frame-shaped insert 3 fill out larger surfaces of the space between the upper-side layer 4 and the lower-side layer 5, as is shown, for example, in corner areas 7 in FIGS. 1, 2, and 3 or also in FIG. 5.

In the illustrated embodiment examples, punched-out areas 8 within the spacer materials 2 are present that are filled with inlays 9. The material for these inlays 9 is preferably the same material used for the frame-shaped insert 3. The preferred material for the frame-shaped insert 3 and/or the inlays 9 is a foamed material that moreover is essentially closed-cell construction and therefore airtight, or a closed-cell foam rubber. Other materials for the frame-shaped insert 3 and/or the inlays 9 are closed-cell sponge, film, reversible stressable plastic polymer, fleece, felt, or a silicone-type material.

The inlays 9 must consist of an essentially airtight material so that no air is guided over the material 9 of the inlays in the area of the inlays at least toward the upper-side layer 4 although a slight non-airtightness of the inlays 9 does not influence the heating and cooling properties. They must therefore consist of an essentially airtight material. This also applies for the material of the frame-shaped insert 3.

The various materials used for the frame-shaped insert 3 and/or the inlays 9 should be airtight. Since some materials designated as airtight still permit a certain air flow, designation of the materials of the insert 3 and/or of the inlays 9 as essentially airtight also applies to those materials that are up to 30% non-airtight. However, it is preferred for the non-airtightness to be less than 20%, and more preferably, less than 10% or less than 5%.

It is visible from FIGS. 1, 2, and 4 through 7 that the inlays 9 are positioned within the air-distribution chamber 1 such that they guide, distribute, and/or channel the air flow within the air-distribution chamber 1 to or from the air-inlet aperture 6 if they are used as an air-outlet aperture. Air circulation within the air-distribution chamber 1 results via air-outlet apertures 10 in the upper-side layer 4 that may be distributed across the surface of the upper-side layer 4. They are positioned such that their quantity per unit of area increases as the separation from the air-inlet aperture 6 increases.

In order to channel the air flow within the air-distribution chamber 1, the inlays 9 may be connected to the frame-shaped insert 3, as is shown in FIGS. 1, 2, 4, 6, and 7 at the locations designated with reference index 11. Along with the tear-drop shape, a rounded approach surface of the inlays 9 at the ends at least as seen along the direction of flow (see FIGS. 1 and 7) is preferred.

Pass-through apertures 12 (see also FIG. 4B) passing through the spacer material 2 and extending in the upper-side layer 4 and potentially extending in the lower-side layer 5 are present within at least a portion of the inlays 9, which may serve as anchoring apertures for a seat cover and extend for such use into an upholstery core (not shown). Since these pass-through apertures 12 are formed in the inlays 9, they are sealed against the air-distribution chamber 1 by means of a suitable essentially airtight material of the inlays 9 without requiring additional design measures.

In connection with the frame-shaped insert 3 and the inlays 9, a woven fabric, a non-woven textile, a plastic film, or a membrane-film material may be used as preferred material for the upper-side layer 4. Such materials are on the one hand moisture-permeable, and on the other hand, are simple to adhere to the upper side of the frame-shaped insert 3 and the inlays 9. This upper-side layer 4 should possess a thickness of 0.5 mm to 10 mm, preferably from about 1 mm to 3 mm, especially if they are implemented as a fleece. An airtight material, e.g., a plastic film, felt, compressed fleece, or membrane-film material is used as the material for the lower-side layer 5. In contrast to the material for the upper-side layer 4, the material of the lower-side layer 5 must be airtight.

It is also possible for a heating layer to be mounted on the upper-side layer 4. The upper-side covering layer preferably forms the heating layer.

The material of the box-shaped insert 3 and/or of the inlays 9 should preferably possess a kiloPascal value of 2 kPa through 30 kPa, preferably a kiloPascal value from 2 kPa to 15 kPa, and particularly preferably a kiloPascal value from 4 kPa through 10 kPa. Such a value, which the separating material 2 should also have, ensures that the heating and cooling device remains stable in shape even when a person sits down in the seat.

The Figures show that the air-distribution chamber 1 is subdivided by the inlays 9 into three flow channels or flow areas, namely seen crosswise to the flow paths between the air-inlet aperture 6 and air-outlet apertures 10. When this heating and cooling device is integrated into a seat-base surface or seat back of a vehicle seat, this cross direction corresponds to the width of the seat-base surface or seat back.

Figure 3:
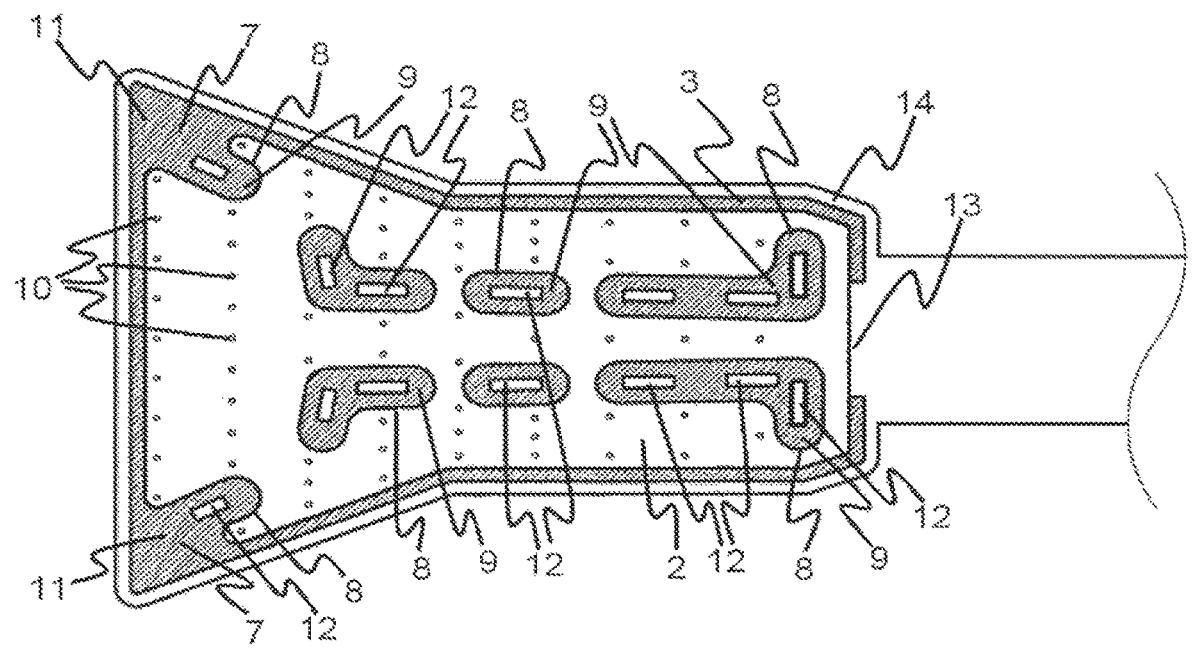
FIG. 3 is a third embodiment example of a ventilating device based on the invention with additional air-inlet and/or air-outlet component.
Figure 4A:
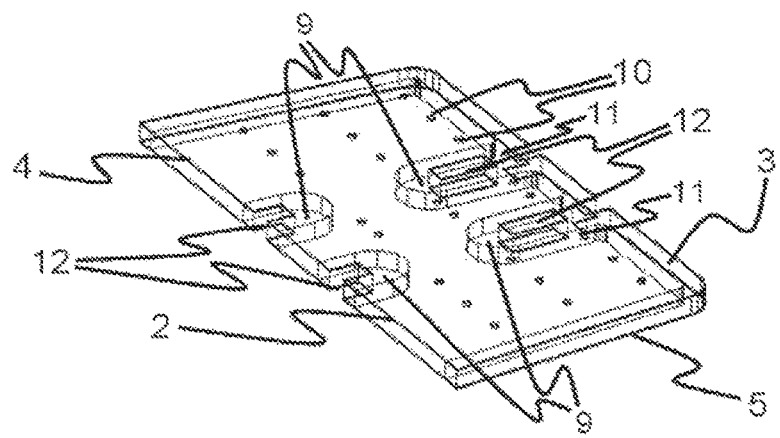
FIG. 4A is a perspective partial view of the ventilating device from FIG. 1 seen from projection 4A-4A in FIG. 1.
Figure 4B:
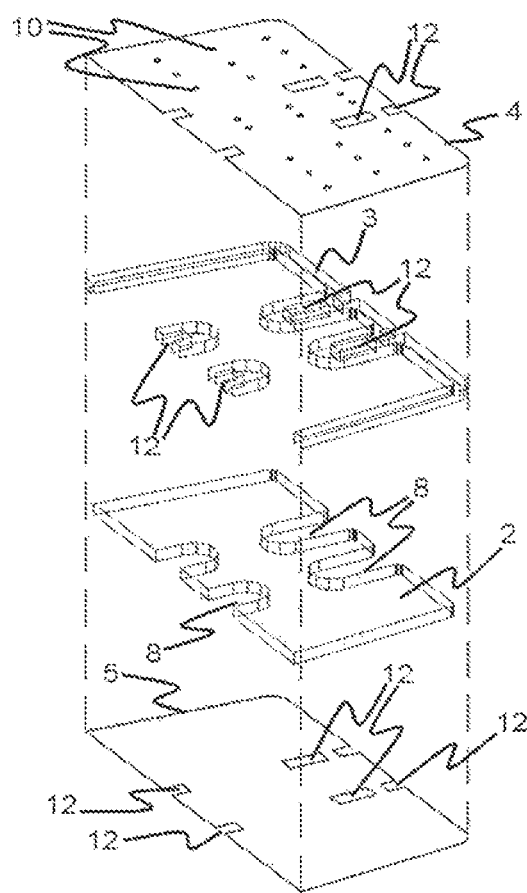
FIG. 4B is the partial view of the ventilating device from FIG. 4A in exploded view.
Figure 5:
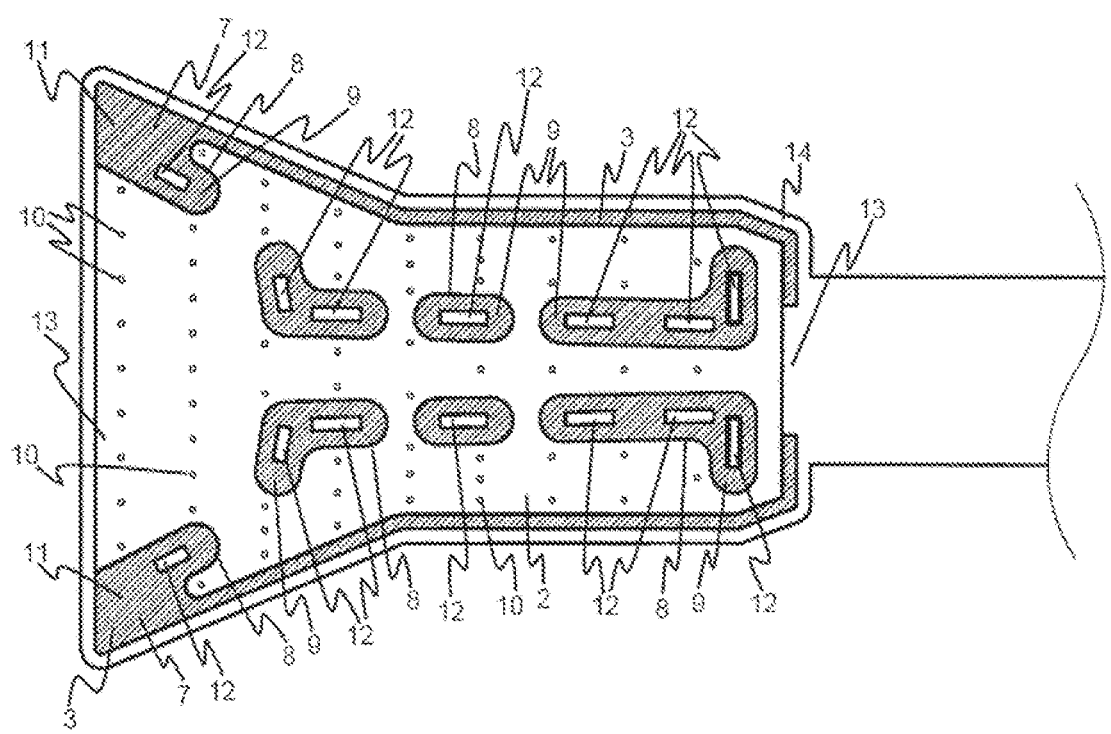
FIG. 5 is a representation per FIG. 3 of an additional embodiment example of the invention.

In FIGS. 3 and 5, one end of the frame-shaped insert 3 is interrupted by an interruption 13 so that, in such implementations of FIGS. 3 and 5, the air-inlet aperture shown in FIGS. 1, 2, 6 and 7 through 9 designated with reference index 6 is replaced by this interruption. The heating and cooling device per FIGS. 3 and 5 is, for example, provided for mounting in a seat back, whereby in such case, the aperture 13 may be connected with a fan (not shown) by means of suitable means, e.g., a film tube, a spiral-shaped material, or a knitted separator in which channels are provided.

In FIG. 5, which is an additional embodiment example of FIG. 3, two ends of the frame-shaped insert 3 possess an interruption 13 so that, in such implementation of the air-inlet aperture designated with the reference index 6 in FIGS. 1, 2, and 6 through 9, it is replaced by this interruption, and as may be seen in FIG. 5, the frame-shaped insert 3 is also interrupted in a front area of the heating and cooling device opposite the air-inlet aperture, which can be necessary if the installation situation in the front area of an upholstery core (not shown) does not allow this. In this case, the upper-side layer is connected with the lower-side layer in this area by means of adhesives placed in between. It is thus necessary in this embodiment example to extend the frame of the frame-shaped insert 3 to at least two sides of the outer circumference of the heating and cooling device.

In FIGS. 1, 2, and 6 through 9, the air-inlet aperture 6 is located eccentrically in the upper-side or lower-side layer 4, 5. An eccentrically-mounted air-inlet aperture 6 in the upper-side or lower-side layer 4, 5 is also possible depending on which version the installation situation permits. The air-outlet apertures 10 are distributed correspondingly eccentrically on the upper-side layer 4 of the heating and cooling device so that homogenous air distribution may be achieved on the side facing the person in spite of the eccentrically-mounted air-inlet aperture 6.

Figure 10:
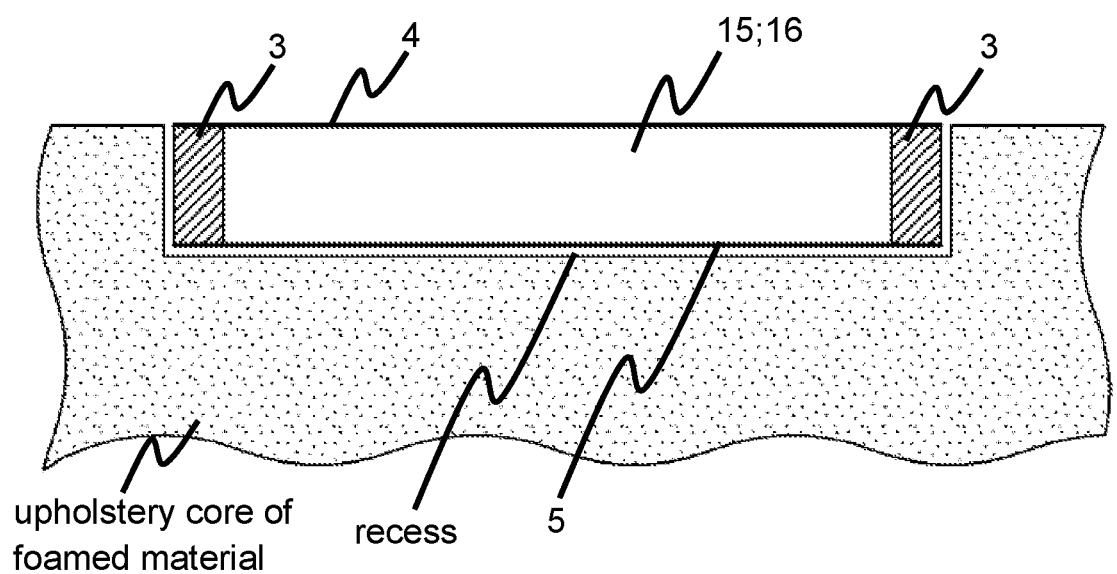
FIG. 10 is a cross-sectional view of an upholstery core with a recess and the heating and cooling device as shown in FIG. 1 inserted into the recess.

FIG. 10 shows a cross-sectional view of an upholstery core in part made of foamed material, in accordance with various embodiments. A recess is formed into the foam material of the upholstery core and a heating and cooling device (e.g., devices 15 and 16), as shown in various embodiments, is inserted into the recess. As shown in FIG. 10, the device 15 and 16 may include a frame shaped insert 3, which may form a circumference of the device 15 and 16. Device 15 and 16 may also include an upper surface 4 and a lower surface 5. The recess may include side walls and a surface, such that lower surface 5 engages the recess surface and the frame-shaped insert 3 engages the side walls, causing device 15 and 16 to be inserted in its entirety into the recess.

There has thus been shown and described a novel ventilating device for a vehicle seat which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A system, comprising:
    a vehicle seat comprising:
        an upholstery core of foamed material with an upper surface forming a seating surface, wherein a recess is formed in the seating surface, said recess having side walls and a bottom surface; and
        a ventilating device being entirely inserted into the recess of the seating surface, the ventilating device further comprising:
            (a) a spacer material that forms at least a portion of an air-distribution chamber,
            (b) an upper-side layer covering the spacer material on an upper side thereof,
            (c) a lower-side layer having a first surface and positioned on an underside of the spacer material and therefore on a side opposite from the upper-side layer in relation to the spacer material;
            wherein the upper-side layer is essentially airtight,
            wherein the upper layer and the lower layer are two separate layers, and
            wherein the upper-side layer and the lower-side layer are connected together about an outer circumference of the spacer material by a frame-shaped insert, thereby forming the air-distribution chamber, and
            (d) an air-inlet aperture to the air-distribution chamber and air-outlet apertures in the upper-side layer to remove air from the air-distribution chamber;
    wherein the frame-shaped insert has an outer edge and is formed of foam material;
    wherein the upper-side layer and the lower-side layer end directly at the outer edge of the frame-shaped insert, such that the upper-side layer and the lower-side layer, projected one onto the other, are matched to an outer shape of the frame-shaped insert; and wherein therefore the upper-side layer is connected only to an upper side of the frame-shaped insert and the lower-side layer is connected only to a lower side of the frame-shaped insert.

2. The system as in claim 1, wherein the frame-shaped insert is formed of a closed-cell foam material.

3. The system as in claim 1, wherein the frame-shaped insert is adhered to at least one of the upper-side layer and the lower-side layer.

4. The system as in claim 1, wherein the frame-shaped insert has a width, viewed in the direction of the upper-side layer or of the lower-side layer, of from 5 mm to 30 mm.

5. The system as in claim 1, wherein the frame-shaped insert viewed in a direction perpendicular to a plane of the upper-side layer or of the lower-side layer possesses a thickness that corresponds to a thickness of the spacer materials in this direction.

6. The system as in claim 1, wherein the spacer material possesses at least one punched-out area that is filled with an inlay of essentially non-airtight material.

7. The system as in claim 6, wherein the inlay of at least one punched-out area is connected with the frame-shaped insert by at least one spar to form a single piece with the frame-shaped insert.

8. The system as in claim 6, wherein at least one inlay is adhered to at least one of the upper-side layer and the lower-side layer.

9. The system as in claim 6, wherein a minimum of one inlay is adhered to the spacer material.

10. The system as in claim 6, wherein a pass-through aperture is present, extending from the upper-side layer to the lower-side layer in the area of at least one inlay, that continues through the upper-side layer.

11. The system as in claim 10, wherein the pass-through aperture continues through the lower-side layer.

12. The system as in claim 6, wherein a minimum of at least one inlay of the at least one punched-out area is formed as a flow-guide body to guide and distribute or channel an air flow within the air-distribution chamber.

13. The system as in claim 6, wherein a kiloPascal value of at least one inlay of the at least one punched-out area is matched to a kiloPascal value of the spacer material.

14. The system as in claim 1, wherein the upper-side layer, in addition to the air-outlet apertures, is at least partially non-airtight.

15. The system as in claim 1, wherein a number of the air-outlet apertures per unit of area of the air-distribution chamber, viewed in projection onto the upper-side layer, increases as the distance from the air-inlet aperture increases.

16. The system as in claim 1, wherein a kiloPascal value of the frame-shaped insert is matched to a kiloPascal value of the spacer material.

17. The system as in claim 1, wherein the air-inlet aperture to the air-distribution chamber is formed by an opening in the frame-shaped insert.

18. The system as in claim 1, wherein the upper-side layer on a side facing toward a seat occupant possesses a partial area that includes at least one of a ferromagnetic material and a magnetic material.

19. The system as in claim 1, wherein the frame-shaped insert possesses a width, viewed in a direction of a plane of the upper-side layer or of the lower-side layer, of from 5 mm to 20 mm.

20. The system as in claim 1, wherein the frame-shaped insert possesses a width, viewed in a direction of a plane of the upper-side layer or of the lower-side layer, of from 10 mm to 15 mm.

21. The system as in claim 1, wherein the upper-side layer possesses greater surface area than a second surface limited by an outer shape of the frame-shaped insert so that a surface section projects above the upper-side layer about the circumference of the frame-shaped insert, whereby the ventilating device may be secured to the upper side of an upholstery core of foamed material for the vehicle seat by means of this projecting surface section when inserted into a recess of the upholstery core.

* * * * *